Aug. 18, 1964
I. S. SULLIVAN
3,144,818
COMBINED FEEDER, CONDITIONER, AND
DEWATERER FOR A DEHYDRATOR
Filed Jan. 9, 1962
2 Sheets-Sheet 1
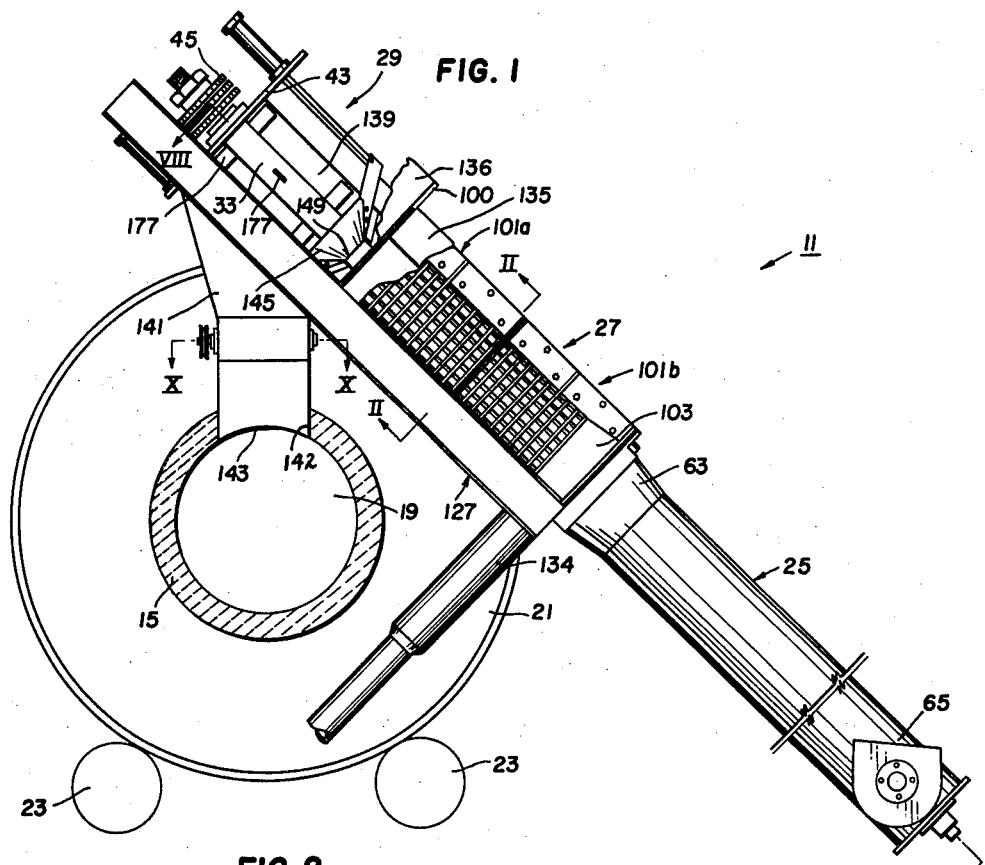
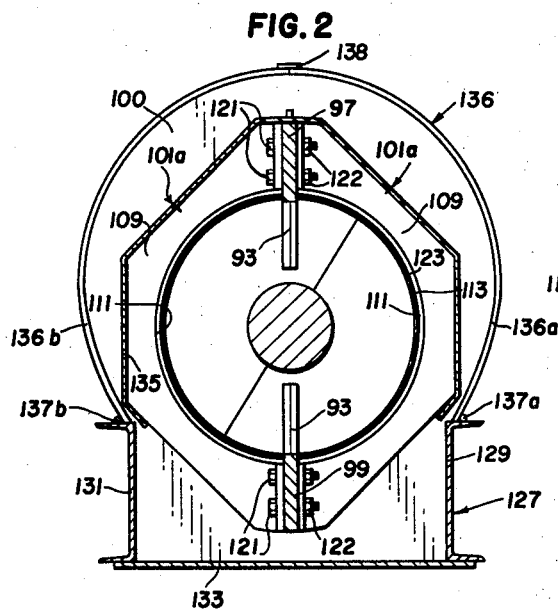
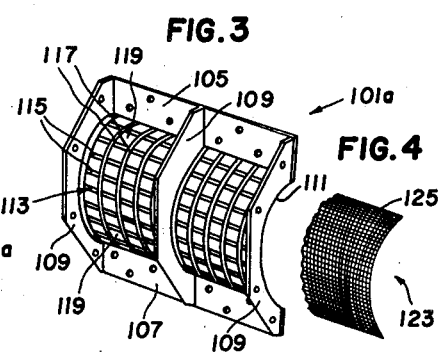
INVENTOR.
IVAN S. SULLIVAN
BY John R. Walker, III
Attorney Aug. 18, 1964       I. S. SULLIVAN       3,144,818
COMBINED FEEDER, CONDITIONER, AND
DEWATERER FOR A DEHYDRATOR
Filed Jan. 9, 1962       2 Sheets-Sheet 2
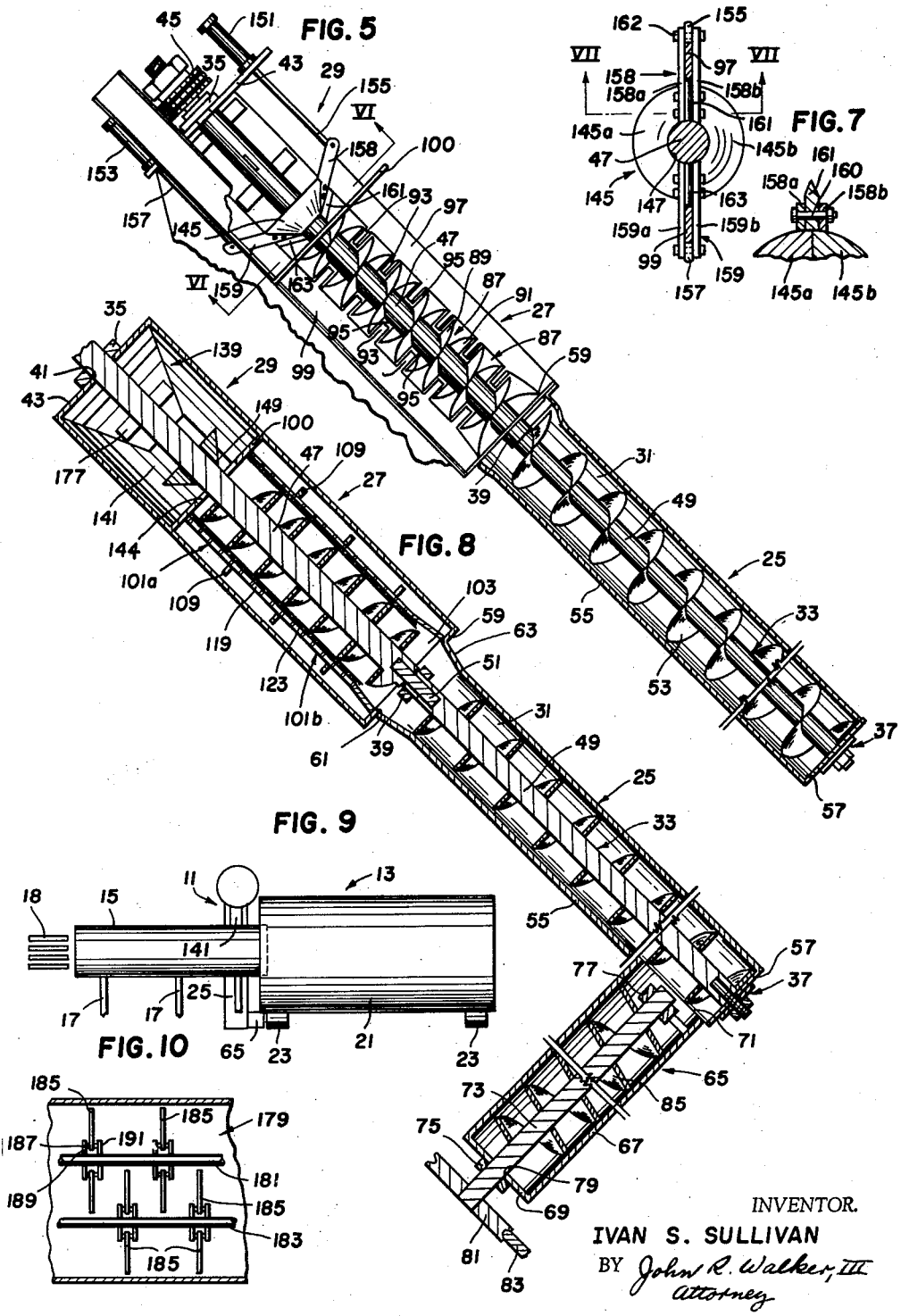
INVENTOR.
IVAN S. SULLIVAN
BY John R. Walker, III
Attorney

United States Patent Office

3,144,818
Patented Aug. 18, 1964

3,144,818
COMBINED FEEDER, CONDITIONER, AND
DEWATERER FOR A DEHYDRATOR
Ivan S. Sullivan, Tiptonville, Tenn., assignor of forty percent to Reelfoot Alfalfa Mill, Tiptonville, Tenn., a partnership
Filed Jan. 9, 1962, Ser. No. 165,203
6 Claims. (Cl. 100—98)

This invention relates to feeder, conditioner and dewaterer means for dehydrators of the type used in dehydrating fibrous substances such as alfalfa hay and the like.

In previous devices of the above mentioned type there have been various pieces of equipment for performing the functions of conveying and dewatering. For example, usually there is a separate dewatering apparatus with a conveyor leading to the dewatering apparatus from the plate where the green hay is located, and another conveyor leading from the dewatering apparatus to the dehydrator. Also, in these previous devices various air lock arrangements have been provided to keep outside air from directly entering the dehydrator furnaces so that the hay and the like is kept from burning. The present invention is directed towards providing a simplified and unique arrangement which eliminates the use of the conveyors leading to and from the dewatering apparatus and eliminates the air lock, by letting the dewaterer serve as a conveyor and as an air lock. It is further directed towards providing such an arrangement which also conditions the hay and the like.

Thus, one of the objects of the present invention is to provide an improved feeder, conditioner and dewaterer means for dehydrators.

A further object is to provide such a feeder, conditioner and dewaterer means which is simple in construction and economical to manufacture, yet which is highly efficient.

A further object is provide such a feeder, conditioner and dewaterer means which is so arranged that the dewaterer portion is utilized as a conveyor and as an air lock.

A further object is to provide such a feeder and dewaterer means which includes unique ribbed sections and screens in the dewaterer portion.

A further object is to provide means for increasing the capacity of dehydrators.

A further object is to provide means for adjusting the device to accommodate varying conditions of the hay and the like.

A further object is generally to improve the design and construction of feeder, conditioner and dewaterer means for a dehydrator furnace.

The means by which the foregoing and other objects of the present invention are accomplished and the manner of their accomplishment will be readily understood from the following specification upon reference to the accompanying drawings, in which:

FIG. 1 is a side elevational view of the device of the present invention with the covers thereof being broken away for purposes of illustration and showing the attachment of the present invention to a dehydrator furnace.

FIG. 2 is an enlarged sectional view taken as on the line II—II of FIG. 1.

FIG. 3 is a perspective view on a reduced scale of one of the ribbed sections which form a part of the dewatering means.

FIG. 4 is a fragmentary perspective view of a portion of the fine screen of the dewatering means.

FIG. 5 is a fragmentary side elevational view of a portion of the device shown in FIG. 1 with parts being broken away and removed for purposes of illustration and with the elevator auger housing being shown in section.

FIG. 6 is an enlarged sectional view taken as on the line VI—VI of FIG. 5.

FIG. 7 is a further enlarged fragmentary sectional view taken as on the line VII—VII of FIG. 6.

FIG. 8 is a fragmentary sectional view taken as on the line VIII—VIII of FIG. 1.

FIG. 9 is a diagrammatic view on a reduced scale showing the overall relationship of the device of the present invention with a dehydrator furnace.

FIG. 10 is a fragmentary sectional view on an enlarged scale taken as on the line X—X of FIG. 1.

Referring now to the drawings in which the various parts are indicated by numerals, the general environment of the feeder, conditioner and dewaterer device 11 of the present invention is best seen in FIGS. 1 and 9, which show a dehydrator 13 of the general type with which device 11 is adapted to be used. Dehydrator 13 includes the usual furnace 15 mounted on supports 17, which furnace is adapted to direct hot gases from a burner 18 through an opening 19 in drum 21 by means of blowers, not shown. Drum 21 is caused to revolve in the usual manner as by rotatably driven rollers 23 which support the drum. The device 11 of the present invention causes the hay and the like tot be fed into the dehydrator furnace 15 adjacent opening 19 in a manner later to be described.

Referring now more specifically to device 11, it comprises in general three major parts, an elevator conveyor portion 25, a dewaterer portion 27, and a discharge portion 29. These three portions, i.e. 25, 27, and 29, are in line with one another and in end-to-end relationship so that they establish a substantially straight channel 31 in which travels the hay and the like being processed. Portions 25, 27, and 29 are angled upwardly from adjacent the ground so that discharge portion 29 is spaced above the ground in position to empty into dehydrator furnace 15. A shaft 33 is rotatably mounted in device 11 and extends throughout the length of elevator conveyor portion 25, dewaterer portion 27, and discharge portion 29. Shaft 33 is rotatably supported by suitable means as bearings 35, 37 respectively mounted in device 11 adjacent the upper and lower ends thereof. In addition, a bearing 39 supports shaft 33 intermediate the ends thereof. The upper end of shaft 33 extends through an aperture 41 in the portion of device 11 that forms the upper end member 43 of discharge portion 29 and extends through bearing 35 to the outside of the device where sprockets 45 are fixedly attached. Sprockets 45 provide the motion transmission means for rotating shaft 33 from suitable drive means, not shown. Shaft 33 is preferably formed for ease of assembly in two parts, that is, an upper part 47 and a lower part 49 which are keyed together in end-to-end relationship as by means of a pin 51 extending into aligned sockets in the adjacent ends of the parts 47, 49.

Referring now more specifically to elevator conveyor portion 25, it comprises an elevator auger 53 fixedly mounted on shaft 33 in elevator conveyor portion 25 and extending from adjacent the lower end of the elevator conveyor portion upwardly throughout the length thereof to a point adjacent dewaterer portion 27. In addition, elevator conveyor portion 25 includes a tubular housing 55 which surrounds elevator auger 53 in close spaced adjacency thereto. Tubular housing 55 is closed adjacent the lower end thereof as by the end piece 57 and extends therefrom to dewaterer portion 27 where it is fixedly attached by suitable means to a plate 59 that forms the lower end of the dewaterer portion. Plate 59 is provided with an opening 61 which is of larger diameter than the interior diameter of the main portion of tubular housing 55 so that the hay and the like can flow past bearing 39 without being restricted. Also, the tubular housing 55 is flared outwardly adjacent the upper end thereof as at 63 for this same reason. Stated another way, the channel 31 is enlarged adjacent bearing 39 so that intermediate bearing 39 will not cause a restriction in the flow of the hay and the like past the bearing.

Adjacent the lower end of elevator conveyor portion 25 is provided a lateral feed conveyor 65 that includes an upwardly opening trough 67 closed at one end as at 69 and open adjacent the opposite end where it is in communication with channel 31 through an opening 71 in the side of tubular housing 55. In addition, feed conveyor 65 includes a transverse shaft 73 rotatably supported in trough 67 by suitable means as bearings 75 and 77. Transverse shaft 73 extends outwardly through an aperture 79 in end 69, through bearing 75 and to the exterior thereof where a pulley 81 is fixedly mounted thereon which is engaged by a belt 83 that in turn leads to suitable drive means, not shown, for rotating transverse shaft 73. Also, feed conveyor 65 includes a helical feed auger 85 fixedly mounted on transverse shaft 73 in trough 67 so that as the green hay or the like is placed in trough 67 it will be forced laterally into channel 31 adjacent the lower end thereof. Shaft 73 is rotated at a much higher r.p.m. than shaft 33 so that the hay and the like is forced through opening 71 in such a manner that auger 53 will have to take the hay and the like, whereupon it will be carried upwardly at an angle through elevator conveyor portion 25 and through opening 61 into dewaterer portion 27.

Referring now more specifically to dewaterer portion 27, it comprises a plurality of sets 87 of conveyor flights mounted on shaft 33 in dewaterer portion 27 in spaced relationship along the shaft. Each of sets 87 includes a pair of helical conveyor flights 89, 91 with each flight extending only part of the way around shaft 33.

A plurality of blades 93 respectively extend in the spaces 95 between the sets 87, so that the hay and the like is urged against the blades which not only causes the water to be squeezed therefrom but also conditions the hay and the like by flattening, tearing apart and/or breaking the stems thereof, which results in an increase in the overall production of dehydrator 13 in a manner later to be described. Blades 93 are fixedly attached to upper and lower backbone members 97, 99 and extend inwardly towards shaft 33 in close spaced adjacency thereto. Backbone members 97, 99 are respectively fixedly attached to plate 59 by suitable means and extend parallel to one another respectively over and below the sets 87 and then through notches, not shown, in a plate 100 which divides dewaterer portion 27 from discharge portion 29. Backbone members 97, 99 extend past plate 100 and through discharge portion 29 where the backbone members are attached adjacent their upper ends to end member 43. Dewaterer portion 27 additionally includes a pair of ribbed sections 101a, 101b. Ribbed section 101a is preferably in two halves with one of the halves being mounted on one side of backbone members 97, 99 and the other half being mounted on the opposite side of the backbone members. Likewise, ribbed section 101b is made in two halves with one of the halves being mounted on one side of backbone members 97, 99 and the other half being mounted on the opposite side of the backbone members so that with the ribbed section 101a the flights 89, 91 are completely surrounded and the ribbed sections 101a and 101b establish a portion of channel 31. In other words, ribbed sections 101a and 101b are mounted in end-to-end relationship and extend completely over flights 89, 91 from the lower end of dewaterer portion 27 to the upper end thereof. Ribbed sections 101a and 101b are substantially the same except that ribbed section 101b is provided with a solid funnel portion 103 adjacent the entrance end of ribbed section 101b, which funnel portion leads from opening 61 along a minor portion of the length of section 101b. Since ribbed sections 101a and 101b are substantially the same, the following description of the ribbed section 101a should suffice for both. One of the halves of ribbed section 101a is shown in FIG. 3, wherein it will be seen the ribbed section comprises spaced upper and lower parallel vertical members 105, 107 interconnected by spaced rigid ribs 109 that have substantially semicircular surfaces 111 to which a substantially semi-circular rigid backing screen 113 is attached. The backing screen 113 extends across the spaces between the ribs 109 and is formed of rigid elongated crossed members 115, 117 which are spaced apart to provide relatively large interstices 119. The vertical members 105, 107 are the portions of the ribbed sections that are actually attached to backbone members 97, 99 with the attachment preferably being by means of bolts 121 that extend through aligned apertures in the ribbed sections and the backbone members with nuts 122 being threaded on bolts 121 so that the ribbed sections can be removed for purposes of cleaning, repair and the like. In addition, ribbed sections 101a and 101b are preferably removably attached to each other as by bolts, not shown, and at the opposite ends therefrom are preferably removably attached to plate 100 and plate 59 as by bolts, not shown. Around the interior of backing screen 113 is fitted and attached thereto by suitable means another screen 123 having smaller interstices 125 than interstices 119. Screen 123 is preferably in halves like the rib members and it will be understood that the size of the interstices 125 therein should be selected so that the smallest particles of hay and the like to be processed in device 11 will not pass therethrough. From the foregoing it will be understood that very efficient, simple, and well constructed means is provided for separating the water and juice from the hay and the like. Thus, it will be understood that the hay is pressed outwardly against the fine screen 123 which is reinforced by the backing screen 113, that is further reinforced by ribs 109.

The water and juice from the hay and the like which is squeezed therefrom will flow through the interstices 119, 125 and down into a pan 127 disposed below ribbed sections 101a and 101b. Pan 127 preferably comprises spaced side channel members 129, 131 and a bottom 133 fixedly attached adjacent opposite side edges thereof to the channel members and which bottom extends from plate 59 to plate 100. However, channel members 129, 131 preferably extend beyond plate 100 along the discharge portion 29. Pan 127 is drained through a suitable conduit 134 attached thereto with the upper end of the conduit communicating with the interior of the pan adjacent the lower portion thereof, as best seen in FIG. 1. A suitable removable cover 135 extends over the upper portion of dewaterer portion 27 from end to end thereof and preferably closely conforms to ribs 109, as best seen in FIG. 2.

Referring now more specifically to discharge portion 29, it includes an arcuate and removable cover 136 which encloses the upper part of the discharge portion and is preferably formed in two halves 136a and 136b which are respectively hingedly attached to channel members 129, 131 by piano type hinges 137a, 137b. Cover halves 136a and 136b, when in a closed disposition as shown in FIG. 2, preferably meet along the upper midportion of device 11 and are held together by suitable lock means as at 138. Cover 136 extends over and makes a close fit with end member 43 and plate 100 so that the discharge portion 29 is substantially airtight. Also, cover 136 is sufficiently strong to withstand the forces from the hay and the like in discharge portion 29. Discharge portion 29 thus includes a discharge chamber 139 which forms the upper portion of channel 31 and which is enclosed by cover 136, plate 100, end member 43, side angle members 129, 131, and at the bottom thereof by a funnel-like discharge spout 141 that extends through an opening 142 in the top of furnace 15 and terminates in an open lower end 143 adjacent the opening 19 of drum 21, as is common in the industry. An opening 144 in plate 100 communicates chamber 139 with dewaterer portion 27. In discharge portion 29, a frusto-conically shaped choke cone 145 is slidably mounted on shaft 33 with the shaft extending through a central opening 147 in the choke cone, and with the smaller end 149 of the choke cone being nearest opening 144. Means are provided for moving choke cone 145 into and away from opening 144 to vary the amount of hay and the like permitted to discharge through the opening into chamber 139. For example, when wet hay and the like is run through the device 11, the choke cone is moved towards opening 144 to cause the hay to be more tightly squeezed in dewaterer portion 27 and when dry hay is run, the choke cone can be moved away from the opening or completely removed in a manner later to be described.

The above mentioned means for moving choke cone 145 is preferably by a pair of jacks 151, 153 mounted on end member 43. Jacks 151, 153 are respectively provided with piston rods 155, 157 extending through apertures, not shown, in end member 43 and respectively attached adjacent the distal ends thereof to support members 158, 159. Support members 158, 159 are respectively slidably supported on backbone members 97, 99, and the support members are preferably formed in two parts, namely 158a, 158b and 159a, 159b, respectively, which are disposed on opposite sides of their related backbone members. Also, choke cone 145 is preferably formed in two halves, namely 145a and 145b. The support member halves 158a and 159b are fixedly attached adjacent the inner ends thereof to choke cone half 145a on opposite sides thereof as by welding or the like. In a like manner, support member halves 158b and 159b are fixedly attached to the other choke cone half 145b at places which are opposite support member halves 158a and 159a. Choke cone halves 145a and 145b are removably held together by means of bolts 160 extending through aligned apertures in support member halves 158a and 158b and also through aligned apertures in a flow-dividing knife 161 that is disposed between the support member halves and is provided with a sharpened edge extending towards openings 144 for a purpose later to be described. In addition, a bolt 162 extends through aligned apertures in the outer end of support member halves 158a and 158b and through an aligned aperture in the distal end of piston rod 155 to provide the means for removably attaching the piston rod to the support member 158. In a manner similar to that above described, the support member halves 159a and 159b are removably attached together to hold the lower portions of cone halves 145a and 145b together. Also, in a manner as above described the piston rod 157 is removably attached to support member 159 and a flow-dividing knife 163 similar to flow-dividing knife 161 is provided between support members halves 159a and 159b. Thus, the flow-dividing knives 161 and 163 are disposed on opposite sides of cone 145 and when the flow of the compressed hay and the like moves through opening 144 the compressed flow will engage knives 161, 163 to split the flow which gives a much more efficient operation in discharge portion 29. From the foregoing it will be understood that the choke cone 145 can be easily and quickly removed from shaft 47. Also, from the foregoing it will be understood that actuation of jacks 151, 153 in one direction by suitable means, not shown, such as hydraulic fluid and suitable valves, will cause piston rods 155, 157 to move downwardly and slide choke cone 145 downwardly towards opening 144, and actuation of jacks 151, 153 in the opposite direction will cause piston rods 155, 157 to move upwardly which wlil slide the choke cone upwardly therewith. Discharge portion 29 additionally includes cleaning blades 177 which are fixedly attached to shaft 33 in discharge chamber 139 and extend outwardly from the shaft. Cleaning blades 177 are preferably arranged on opposite sides of shaft 33 and with some of the cleaning blades extending 90 degrees relative to the others. The function of cleaning blades 177 is to unclog or clean out the hay and the like from discharge chamber 139 so that it will fall down into discharge spout 141.

Located in discharge spout 141 is a cake breaking device 179 which preferably includes a pair of spaced horizontally extending shafts 181, 193 which are rotatably mounted in the spout and driven in opposite directions and at different speeds by suitable means, not shown. Each of shafts 181, 183 has mounted thereon a plurality of pivoted hammers 185. Each of hammers 185 is pivotally mounted from its related shaft as by means of a pin 187 extending through aligned apertures in the hammer and a pair of studs 189, 191 which are fixedly attached to the shaft and outwardly extend therefrom. Thus, each of hammers 185 is pivotable about pin 187 so that when the shafts 181, 183 are rotated the hammers will strike the cakes in the hay and the like so as to break the cakes up. Also, during this operation there occurs a beneficial chopping of the hay and the like which helps in the conditioning theerof. It should be noted that hammers 185 on one of the shafts 181, 183 are staggered relative to the hammers on the other shaft and that the hammers are preferably disposed in pairs on opposite sides of the related shafts with the pairs being spaced apart on its shaft, as best seen in FIG. 10.

From the foregoing description it will be understood that a very efficient and simplified means is provided for dewatering and conditioning hay and the like, and feeding it into a dehydrator. Thus, in the device 11 the hay is carried in the substantially straight channel 31 from adjacent the lower end of the elevator portion 25, into the dewaterer portion 27 which also serves as a conveyor and a conditioner, and where the water is efficiently separated from the hay, and then the dewatered hay passes into the discharge portion 29 where it is caused to fall into the discharge spout 141 wherein the cakes are broken up, the hay further conditioned, and the dewatered hay finally emptied into the dehydrator furnace 15.

The efficiency and advantages of the device 11 of the present invention will be further appreciated when it is considered that an actual operating device constructed in accordance with the present inventioin easily reduces the moisture content of alfalfa hay from 85% to 77%. Parenthetically, it should be noted that these figures are conservative ones and can be surpassed. However, for purposes of this discussion the initial moisture content of 85% has been taken as representing a typical moisture content of hay, and 14,000 pounds has been taken as representing the total weight of a normal truckload of green hay having an 85% moisture content. By lowering the moisture content from 85% to 77%, as is possible with the device 11, there is 5,000 pounds less water to be evaporated by the dehydrator 13. The capacity of dehydrator 13 is limited by the amount water that can be evaporated per hour. Therefore, the lower the percent of moisture content in the hay going into the dehydrator the greater the per hour production of the dehydrator. Thus, it can be seen that by its efficient separation of the water from the hay, the device 11 greatly increases the per hour production of the dehydrator. Also, device 11 is a very versatile device which can take care of the variation of moisture content which occurs in the hay. For example, the moisture content of the hay will generally vary 20% from morning to night. Also, there are varying conditions of the hay during the seasons, that is, in the spring the hay is juicy and in the summer it is much dryer. To take care of these varying conditions, the position of choke cone 145 can be readily changed as heretofore described, or if dry hay is run, choke cone 145 may be easily removed as heretofore described to lessen wear thereon.

Device 11, in addition to lowering the water content of the hay, also increases the production of dehydrator 13 by conditioning the hay. For a better understanding of this, the following background is provided relative to the problem of dehydrating the stems of the hay. Heretofore, the production of the dehydrator has been limited due to the stems of the hay since it has been difficult to dry out the stems as compared with the leaves. This difficulty is encountered due to the fact the liquid is more or less trapped in the stems with substantially the only outlet being through the cut ends of the stem, and also the center of the stem is insulated from the heat by the thickness thereof. However, with the use of the present invention the stems are flattened, torn apart and/or broken so that the liquid inside of the stems is more easily reached by the heat, and a more uniform flow of the stems with the leaves through the dehydrator is obtained.

In summary, it should be pointed out that due to the advtanges heretofore described, a 40% savings in gas consumption of the dehydrator can be realized by the use of device 11, which represents a considerable savings in money.

Although the invention has been described and illustrated with respect to a preferred embodiment thereof, it is to be understood that it is not to be so limited since changes and modifications may be made therein which are within the full intended scope of this invention as hereinafter claimed.

I claim:

1. Apparatus adapted to be used with a dehydrator for hay and the like comprising an elevator portion having a lower end and an upper end, a dewaterer portion forming an extension of said upper end of said elevator portion and establishing therewith a straight channel for the passage of hay and the like first through said elevator portion and then through said dewaterer portion, said dewaterer portion and said elevator portion being in co-axial longitudinal alignment with the longitudinal axes thereof being inclined relative to a horizontal plane, a discharge portion, a plate disposed between said dewaterer portion and said discharge portion and having an opening therein communicating said dewaterer portion with said discharge portion to permit hay and the like to pass therethrough from said dewaterer portion to said discharge portion; a rotatable elongated shaft extending through said elevator portion, said dewaterer portion and said discharge portion; rotatable feed auger means leading into said elevator portion adjacent the lower end thereof for feeding hay and the like to said elevator portion, elevator auger means mounted on said shaft in said elevator portion to move hay therethrough and into said dewaterer portion, a plurality of sets of conveyor flights mounted on said shaft in said dewaterer portion in spaced relationship along said shaft, each of said sets comprising a pair of helical conveyor flights, a plurality of blades respectively extending between said sets of conveyor flights in the spaces therebetween, mounting means adjacent said dewaterer portion, said blades being attached to said mounting means for the support of said blades, rib sections attached to said mounting means in surrounding relationship to said conveyor flights; each of said rib sections comprising a backing screen having interstices therein to permit the liquid from the dewaterer portion to pass therethrough, a second screen having smaller interstices than the interstices in said backing screen disposed around said conveyor flight in close adjacency to said backing screen, and a plurality of rib means attached to said backing screen in spaced relationship along the length thereof and extending outwardly therefrom; drain means disposed below said rib sections for draining the liquid therefrom, choke cone means slidably mounted on said shaft in said discharge portion and movable into and out of closing relationship relative to said opening in said plate for choking the flow of hay and the like into said discharge portion, non-rotating flow-dividing means mounted in said discharge portion adjacent said choke cone for dividing the flow of hay and the like flowing into said discharge portion, funnel means leading from said discharge portion for guiding the dewatered hay and the like into a dehydrator furnace, and means in said funnel means for engaging the dehydrated hay and the like to break up cakes therein and condition the hay and the like.

2. The apparatus of claim 1 in which means is provided for rotating said feed auger means at a greater r.p.m. than said elevator auger so that said elevator auger is forced to take the hay and the like therefrom.

3. Apparatus adapted to be used with a dehydrator for hay and the like comprising an elevator portion having a lower end and an upper end, a dewaterer portion forming an extension of said upper end of said elevator portion and establishing therewith a continuous and substantially straight cylindrical channel for the passage of hay and the like first through said elevator portion and then through said dewaterer portion, said dewaterer portion and said elevator portion being in co-axial alignment with the longitudinal axes thereof being inclined relative to a horizontal plane, a discharge portion, means between said dewaterer portion and said discharge portion providing an opening communicating said dewaterer portion with said discharge portion to permit hay and the like to pass therethrough from said dewaterer portion to said discharge portion; a rotatable elongated shaft extending through said elevator portion, said dewaterer portion and said discharge portion; elevator auger means having a substantially even pitch mounted on said shaft in said elevator portion to move hay therethrough and into said dewaterer portion, a plurality of substantial identical sets of conveyor flights mounted on said shaft in said dewaterer portion in spaced relationship along said shaft, each of said sets comprising a pair of helical conveyor flights, a plurality of blades respectively extending between said sets of conveyor flights in the spaces therebetween, mounting means adjacent said dewaterer portion, said blades being attached to said mounting means for the support of said blades, rib sections attached to said mounting means in surrounding relationship to said conveyor flights; each of said rib sections comprising a backing screen having interstices therein to permit the liquid from the dewaterer portion to pass therethrough, a second screen having smaller interstices than the interstices in said backing screen disposed around said conveyor flights in close adjacency to said backing screen, and a plurality of rib means attached to said backing screen in spaced relationship along the length thereof and extending outwardly therefrom; drain means disposed below said rib sections for draining the liquid therefrom, choke cone means slidably mounted on said shaft in said discharge portion and movable into and out of closing relationship relative to said opening in said plate for choking the flow of hay and the like into said discharge portion and funnel means leading from said discharge portion for guiding the dewatered hay and the like into a dehydrator furnace.

4. Apparatus adapted to be used with a dehydrator for hay and the like comprising an elevator portion having a lower end and an upper end, a dewaterer portion forming an extension of said upper end of said elevator portion and establishing therewith a continuous and substantially straight channel for the passage of hay and the like first through said elevator portion and then through said dewaterer portion, said dewaterer portion and said elevator portion being in co-axial longitudinal alignment with the longitudinal axes thereof being inclined relative to a horizontal plane, a discharge portion, means between said dewaterer portion and said discharge portion providing an opening communicating said dewaterer portion with said discharge portion to permit hay and the like to pass therethrough from said dewaterer portion to said discharge portion; a rotatable elongated shaft extending through said elevator portion, said dewaterer portion and said discharge portion; elevator auger means mounted on said shaft in said elevator portion to move hay therethrough and into said dewaterer portion, means in said dewaterer portion responsive to rotation of said shaft for compressing the hay and the like to separate the liquid therefrom, a pair of spaced backbone members extending through said discharge portion, a choke cone having a central bore therethrough, said choke cone being slidably mounted on said shaft with said shaft extending through said bore and with the smaller end of said choke cone being disposed towards said opening, said choke cone including choke cone halves and means removably securing said halves together whereby said choke cone is removable from said shaft, support members attached to said choke cone and respectively slidably mounted on said backbone members, means attached to said support members for the sliding thereof on said backbone members to carry said choke cone into and out of said opening to vary the choking effect of said choke cone, and funnel means leading from said discharge portion for guiding the dewatered hay and the like into a dehydrator furnace.

5. Apparatus adapted to be used with a dehydrator for hay and the like comprising a dewaterer portion provided with a continuous cylindrical channel therein for the passage of hay and the like, said dewaterer portion having its longitudinal axis inclined relative to a horizontal plane, a discharge portion, means between said dewaterer portion and said discharge portion providing an opening communicating with said dewaterer portion and with said discharge portion to permit hay and the like to pass therethrough from said dewaterer portion to said discharge portion, a rotatable elongated shaft extending through said dewaterer portion and said discharge portion, drive means attached to said shaft adjacent said discharge portion for rotatably driving said shaft, a plurality of substantially identical sets of conveyor flights mounted on said shaft in said dewaterer portion in spaced relationship along said shaft, each of said sets comprising a pair of helical conveyor flights, a plurality of blades respectively extending between said sets of conveyor flights in the spaces therebetween, mounting means adjacent said dewaterer portion, said blades being attached to said mounting means for the support of said blades, rib sections attached to said mounting means in surrounding relationship to said conveyor flights; each of said rib sections comprising a backing screen having interstices therein to permit the liquid from the dewaterer portion to pass therethrough, a second screen having smaller interstices than the interstices in said backing screen disposed around said conveyor flights in close adjacency to said backing screen, and a plurality of rib means attached to said backing screen in spaced relationship along the length thereof and extending outwardly therefrom, drain means disposed below said rib sections for draining the liquid therefrom, choke cone means mounted on said shaft and said discharge portion and movable into and out of closing relationship relative to said opening in said plate for choking the flow of hay and the like into said discharge portion, and funnel means leading from said discharge portion for guiding the dewatered hay and the like into a dehydrator furnace.

6. Apparatus adapted to be used with a dehydrator for hay and the like comprising means establishing an angularly disposed continuous substantially cylindrical channel for the passage of hay and the like therethrough; said means including elevator means for moving the hay and the like from the lower end thereof to the upper end thereof, dewaterer means in substantially unrestricted communication adjacent the lower end thereof with said elevator means adjacent the upper end thereof for moving the hay and the like from said elevator means to the upper end of said dewaterer means and for dewatering and conditioning the hay and the like, said dewaterer means and said elevator means being in co-axial longitudinal alignment with the longitudinal axes thereof being inclined relative to a horizontal plane, and discharge means in communication with the upper end of said dewaterer means for discharging the hay and the like into a dehydrator; said dewaterer means comprising compressing and conditioning means including knives and means for moving the hay and the like against said knives to compress the liquid therefrom and to flatten, tear and break the stems of the hay and the like; rib sections surrounding said compressing and conditioning means; each of said rib sections including a backing screen having interstices therein to permit the liquid from the hay and the like to pass therethrough, a second screen having smaller interstices than the interstices in said backing screen, said second screen being disposed adjacent said backing screen entirely around the interior thereof and entirely around said compressing and conditioning means, and a plurality of rib means attached to said backing screen in spaced relationship along the length thereof and extending outwardly therefrom.

References Cited in the file of this patent

UNITED STATES PATENTS

| | | |
|---|---|---|
| 332,718 | Lafferty | Dec. 22, 1885 |
| 585,800 | Toulouse et al. | July 6, 1897 |
| 604,348 | Bussells | May 17, 1898 |
| 808,193 | Brussels | Dec. 26, 1905 |
| 837,010 | Vernsten | Nov. 27, 1906 |
| 2,397,758 | Sharp | Apr. 2, 1946 |
| 2,709,957 | Napier | June 7, 1955 |
| 2,943,012 | Dunning et al. | June 28, 1960 |
| 3,003,412 | Vincent | Oct. 10, 1961 |

FOREIGN PATENTS

| | | |
|---|---|---|
| 548,403 | Italy | Sept. 25, 1956 |